US009280342B2

(12) United States Patent
Gove

(10) Patent No.: US 9,280,342 B2
(45) Date of Patent: Mar. 8, 2016

(54) VECTOR OPERATIONS FOR COMPRESSING SELECTED VECTOR ELEMENTS

(75) Inventor: Darryl J. Gove, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1000 days.

(21) Appl. No.: 13/187,132

(22) Filed: Jul. 20, 2011

(65) Prior Publication Data
US 2013/0024654 A1 Jan. 24, 2013

(51) Int. Cl.
G06F 9/30 (2006.01)
(52) U.S. Cl.
CPC ........ G06F 9/30036 (2013.01); G06F 9/30018 (2013.01); G06F 9/30032 (2013.01); G06F 9/30043 (2013.01)

(58) Field of Classification Search
CPC combination set(s) only.
See application file for complete search history.

(56) References Cited

U.S. PATENT DOCUMENTS

| 5,752,001 | A | * | 5/1998 | Dulong | 703/2 |
| 6,122,725 | A | | 9/2000 | Roussel | |
| 6,145,072 | A | | 11/2000 | Shams et al. | |
| 6,175,892 | B1 | | 1/2001 | Sazzad et al. | |
| 2004/0054848 | A1 | * | 3/2004 | Folsom | 711/108 |
| 2004/0054879 | A1 | * | 3/2004 | Macy et al. | 712/221 |
| 2004/0210811 | A1 | * | 10/2004 | Jarp et al. | 714/746 |
| 2005/0149701 | A1 | * | 7/2005 | Chen et al. | 712/221 |
| 2006/0184765 | A1 | * | 8/2006 | Krueger | 712/4 |
| 2009/0019269 | A1 | * | 1/2009 | Wolff et al. | 712/225 |

OTHER PUBLICATIONS

Buluc, Aydin., et al., Parallel Sparse Matrix-Vector and Matrix-Transpose-Vector Multiplication Using Compressed Sparse Blocks, 2009, ACM pp. 233-244.*

* cited by examiner

Primary Examiner — Eric Coleman
(74) Attorney, Agent, or Firm — Rory D. Rankin; Meyertons, Hood, Kivlin, Kowert & Goetzel, P.C.

(57) ABSTRACT

A processor, method, and medium for using vector operations to compress selected elements of a vector. An input vector is compared to a criteria vector, and then a subset of the plurality of elements of the input vector are selected based on the comparison. A permutation vector is generated based on the locations of the selected elements and then the permutation vector is used to permute the selected elements of the input vector to an output vector. The selected elements of the input vector are stored in contiguous locations in the leftmost elements of the output vector. Then, the output vector is stored to memory and a pointer to the memory location is incremented by the number of selected elements.

20 Claims, 7 Drawing Sheets

```
for (int i=0; i<N; i++)
{
        if (criteria[i])
        {
                output[index] = input[i];
                index++;
        }
}
```

Code 100

*Code 200*

[205] SET COMPARISON %V0

[210] @TOP

[215] LOAD VECTOR %V1   // Load vector
[220] COMPARE VECTOR %V1, %V0, %V3  // Compare V1 and V0 to find selected
                                    // elements and place indicators in V3
[225] COMPSEL %V3, %V2  // Set up permutation vector
[230] PERMUTE %V1, %V2, %V4  // V4 contains the left-aligned selected elements from
                             // the original vector V1
[235] PERMUTE %V3, %V2, %V5  // Produce a mask identifying those elements selected
[240] SET VECTOR MASK %V5  // Use the mask to ensure that we only store to those
                           // elements that contain valid data
[245] STORE %V4, [OUTPUT]  // Store selected elements to the output vector
[250] POPCOUNT %V5, %R0  // Count the number of bits set in the mask register
[255] SHIFTRIGHT %R0, <element size>, %R0  // Calculate the number of elements stored
[260] OUTPUT = OUTPUT + %R0  // Move pointer by the number of elements stored.

[265] BRANCH TO @TOP

VECTOR OPERATIONS FOR COMPRESSING SELECTED VECTOR ELEMENTS

BACKGROUND OF THE INVENTION

1. Field of the Invention

The present invention relates generally to vector processing, and in particular to compressing selected elements of vectors using single instruction multiple data (SIMD) operations.

2. Description of the Related Art

A commonly performed operation in computing is selecting a subset of elements from a vector based on some criteria and then storing the selected subset in an output vector. An example of this type of operation is illustrated in code 100 of FIG. 1A. Code 100 in FIG. 1A may be executed to perform such a compression operation of selected vector elements, and code 100 is an example of scalar code used to perform the operation. Scalar code (i.e., serial code) may be defined as code that operates on one element of a vector at a time, whereas vector code may be defined as code that operates on all elements of a vector during each instruction.

The comparison operation of an input vector and a criteria vector can be performed as a vector operation. Typically, the result of the vector comparison is a number of stores of individual elements. The number of individual elements may vary from scenario to scenario, and so the individual elements are normally processed using scalar code. However, executing scalar code in a SIMD loop negates much of the benefit gained from using SIMD operations.

Example vectors that may be used in conjunction with code 100 are shown in FIG. 1B. Input vector 110 contains eight elements (labeled 0-7). In other embodiments, input vector 110 may contain various numbers of elements (e.g., 4, 16, 32). In the example shown in FIG. 1B, an element in input vector 110 may meet the criteria if the element is greater than 0x60. Therefore, any element in input vector 110 greater than 0x60 may be selected and compressed to the leftmost locations in output vector 120. The three elements in input vector 110 that are greater than 0x60 reside in the elements labeled 2, 4, and 7. These elements may be stored in the first three elements (0-2) of output vector 120. A limitation with the prior art code of FIG. 1A and the corresponding example vectors illustrated in FIG. 1B is that storing the three selected elements in output vector 120 requires three separate scalar operations.

Also, prior art loop operations for compressing selected elements typically have unpredictable branches in the middle of the loop since the number of selected elements is not known in advance. Unpredictable branches make it difficult for the processor to run at full speed since the processor does not know whether or not a particular branch will be taken. As a result, the processor may be delayed in fetching instructions, leading to bubbles in program execution. Also, it may be more complex for the compiler to generate code based on the unpredictable branches.

Therefore, there is a need in the art for compress select operations that can be executed with SIMD instructions. In view of the above, improved methods and mechanisms of operations for compressing selected vector elements are desired.

SUMMARY OF THE INVENTION

Various embodiments of processors, methods, and mediums for compressing selected elements of vectors are contemplated. In one embodiment, a first vector may be loaded with a plurality of criteria elements and a second vector may be loaded with a plurality of input data elements. Then, the second vector may be compared to the first vector, and a third vector may be generated to indicate which elements of the second vector are selected based on the comparison. Each element of the second vector may be classified as selected or non-selected based on the comparison to the first vector.

A fourth vector may be generated as a permutation vector to specify how to rearrange the selected elements of the second vector. The fourth vector may be generated based on the third vector. The fourth vector may contain an index for each selected element of the second vector, and the index may specify a location of the corresponding selected element of the second vector. In one embodiment, the indices may be arranged in the leftmost contiguous elements of the fourth vector. In another embodiment, the indices may be arranged in the rightmost contiguous elements of the fourth vector.

Then, the selected elements of the second vector may be permuted to the fifth vector using the fourth vector. In one embodiment, the selected elements may be stored in the leftmost contiguous elements of the fifth vector. In another embodiment, the selected elements may be stored in the rightmost contiguous elements of the fifth vector. Next, the fifth vector may be stored to a memory location. The number of selected elements in the fifth vector may be calculated and a pointer to the memory location may be incremented by this number.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2 illustrates an example of code that may execute on a SIMD processor in accordance with one or more embodiments.

DETAILED DESCRIPTION

Figures 1A, 1B:
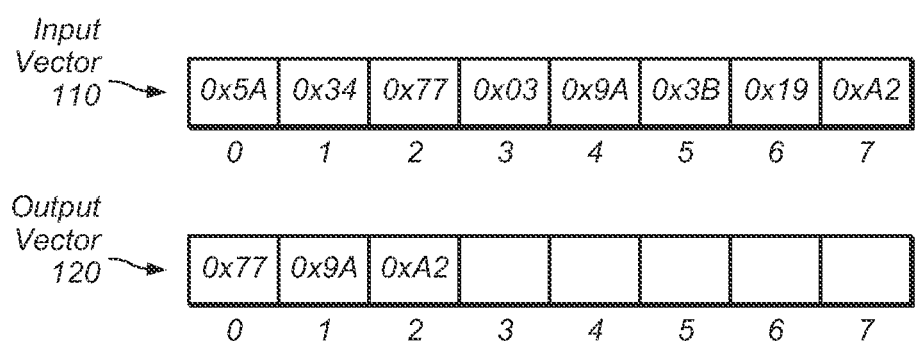
FIG. 1A illustrates a prior art code example of a compression operation of selected vector elements.
FIG. 1B illustrates input and output vectors in accordance with a prior art compression operation.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a vector unit . . . ." Such a claim does not foreclose the processor from including additional components (e.g., an instruction fetch unit, a cache).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 2, an example of pseudocode that may execute on a single instruction multiple data (SIMD) processor in one embodiment is shown. A SIMD processor may also be referred to as a vector processor. It is noted that the instruction and register names (V0-V5, R0) used in code 200 are chosen for illustrative purposes and other names may be used in other embodiments. In one embodiment, each instruction of code 200 may be a vector instruction, such that the instruction operates on the entire vector instead of a single element of the vector.

The first instruction of code 200 may be instruction 205 "SET COMPARISON % V0". The register "V0" may be utilized to store criteria used to perform a comparison. In one embodiment, the objective of the comparison may be to find elements that meet given criteria. For example, such criteria may be whether elements are less than, greater than, or equal to some value. Numerous such criteria are possible and are contemplated.

The location 210 of "@TOP" may be used as a target of branches or jumps from other points in code 200. Next, the instruction 215 "LOAD VECTOR % V1" may be executed to load vector register "V1" with data elements from an input stream, source vector register, or another location. Then, the instruction 220 "COMPARE VECTOR % V1, % V0, % V3" may be executed to find elements in vector register "V1" that meet the criteria stored in vector register "V0". Indicators corresponding to a result of the comparison may be stored in corresponding locations of vector register "V3" (e.g., an indication as to whether or not an element meets the criteria). In one embodiment, the indicators may be the same size as the elements in vector register "V0" or some given addressable unit size. In another embodiment, the indicators may be a single bit ('1'=TRUE, '0'=FALSE) to indicate if the corresponding element in the vector register "V1" meets the criteria in vector register "V0". Other types and sizes of indicators may be utilized in other embodiments.

Next, the instruction 225 "COMPSEL % V3, % V2" may be executed. Instruction 225 may be referred to as a compress selected instruction. Instruction 225 may set up a permutation vector and store the permutation vector in vector register "V2". The permutation vector stored in register "V2" may specify how to rearrange selected values of vector register "V1" within output vector register "V4". For example, in one embodiment the permutation vector is configured to store selected elements in a coalesced manner. In this manner, elements meeting a given criteria may be identified and stored in contiguous locations in order to consume less storage space. Subsequently, instruction 230 "PERMUTE % V1, % V2, % V4" may be executed, which may write the selected elements of vector register "V1" to vector register "V4" as described by permutation vector register "V2". In one embodiment, as a result of instruction 230 the selected elements of vector register "V1" are stored within left most positions of vector register "V4". In another embodiment, the permutation may shuffle the selected elements of vector register "V1" to the right-aligned positions of vector register "V4", or otherwise.

Next, instruction 235 "PERMUTE % V3, % V2, % V5" may be executed to generate a mask in vector register "V5". The mask may be used to identify the elements of vector register "V4" that contain selected data. In one embodiment, elements of vector register "V5" may be the same size as elements of vector register "V4". In another embodiment, vector register "V5" may not be the same size as elements of vector register. In one embodiment, the mask may include a single bit for each element of vector register "V4".

After instruction 235, instruction 240 "SET VECTOR MASK % V5" may be executed. The mask in vector register "V5" may ensure that only selected elements are stored to the output vector register. In one embodiment, the mask may use '1' bits in each element to indicate a selected element of vector register "V4". Other embodiments may use any desired bit or sequence of bits to indicate selected and non-selected elements. For example, if each element has a size of 8 bits and mask elements are the same size, then the mask may use a value of "0xFF" for each selected element. If each element has a size of 16 bits, the mask may contain a value of "0xFFFF" for each selected element, and so on. In other embodiments, the mask may contain a value of '1' corresponding to each selected element. For example, if elements are 8-bits long, then an element in the mask may contain a value of "0x01", and if elements are 16-bits long, then an element in the mask may contain a value of "0x0001", and so on. For non-selected elements, the mask may contain a value of '0'. In other embodiments, these classifications may be reversed, such that a value of '0' in an element of the mask may indicate the corresponding output vector element is selected and a value of "0x01" or "0xFF" may indicate the corresponding output vector element is non-selected.

Next, instruction 245 "STORE % V4, [OUTPUT]" may be executed. This instruction may write the data in vector register "V4" to the location specified by the pointer "OUTPUT". The location specified by the pointer "OUTPUT" may be a memory location, register, or otherwise. In one embodiment, the plurality of elements of vector register "V4" may be written to the location specified by "OUTPUT". In another embodiment, only the selected elements may be written to "OUTPUT". In this embodiment, non-selected elements that do not contain selected data are either not written or are written and may subsequently be overwritten.

Subsequent to instruction 245, a population count instruction 250 "POPCOUNT % V5, % R0" may be executed to count the number of bits set in the mask in vector register "V5". In one embodiment, the mask may contain a '1' bit for each bit of the selected elements of vector register "V4". For example, if vector register "V4" includes two selected elements and each element has a size of 8 bits, then the mask may contain a value of "0xFF" for each selected element of "V4". In this example, the mask would have a total of 16 '1' bits corresponding to the two selected elements. Instruction 250 "POPCOUNT % V5, % R0" may count the number of bits in mask vector register "V5" and store that number in vector register "R0".

In one embodiment, instruction 255 "SHIFTRIGHT % R0, <element size>, % R0" may then calculate the number of selected elements stored in vector register "V4". Prior to this instruction, the value stored in register "R0" may be the total number of '1' bits in mask vector register "V5". The total number of '1' bits may be equal to the total number of selected elements in vector register "V4" multiplied by the number of bits per element. For example, in one embodiment, the element size may be eight bits, the number of selected elements in vector register "V4" may be three, and there may be a "0xFF" value in three elements of mask vector register "V5". In this embodiment, the value in register "R0" would be 24 (3×8 bits=24). For embodiments with an element size of eight bits, the "SHIFTRIGHT" instruction may shift right three positions, effectively dividing the value in register "R0" by 8. The result of instruction 255 may be stored back in register "R0". In other embodiments, the result may be stored in other locations. Also, in other embodiments, the element size may be other sizes, such as 16, 32, or any other suitable size. If the element size is 16, the "SHIFTRIGHT" instruction may shift right four positions, if the element size is 32, the "SHIFTRIGHT" instruction may shift right five positions, and so on.

In some embodiments, if the mask contains a value of "0x01" or other value with a single '1' bit per element, then the "SHIFTRIGHT" instruction may be omitted. In these embodiments, the number of bits set in the mask register may be equal to the number of elements selected in the vector register "V4" and the POPCOUNT instruction provides the number of selected elements. Accordingly, in such an embodiment a divide or shift operation may not be needed. In another embodiment, the number of '1' bits in vector register "V3" may be counted and stored in register "R0". In this embodiment, the use of the vector mask may be omitted.

Next, instruction 260 "OUTPUT=OUTPUT+% R0" may be executed to increment the pointer by the number of selected elements stored. Therefore, on a subsequent instruction, or a subsequent pass through the loop, the next write to the location pointed to by pointer "OUTPUT" may write over any non-selected elements that were also written to the "OUTPUT" location. For example, if vector register "V4" contains eight elements, and three of the elements are selected, then all eight elements (three selected elements and five non-selected elements) may be written to the "OUTPUT" location. However, the pointer will only be incremented by three after the write operation, and so a subsequent write to the "OUTPUT" location will overwrite the five non-selected elements.

After instruction 260, instruction 265 may direct execution of code 200 back to the location of @TOP (e.g., in the event a loop operation is being performed). In other embodiments, code 200 may include other instructions, some of the instructions shown may be omitted, some of the instructions may be combined, and/or some of the instructions may be arranged in a different order. In various embodiments, a program may be written in a higher level software language to perform similar functions as those performed by the instructions of code 200. A compiler may be utilized to compile the higher level program into machine executable instructions.

Figure 3:
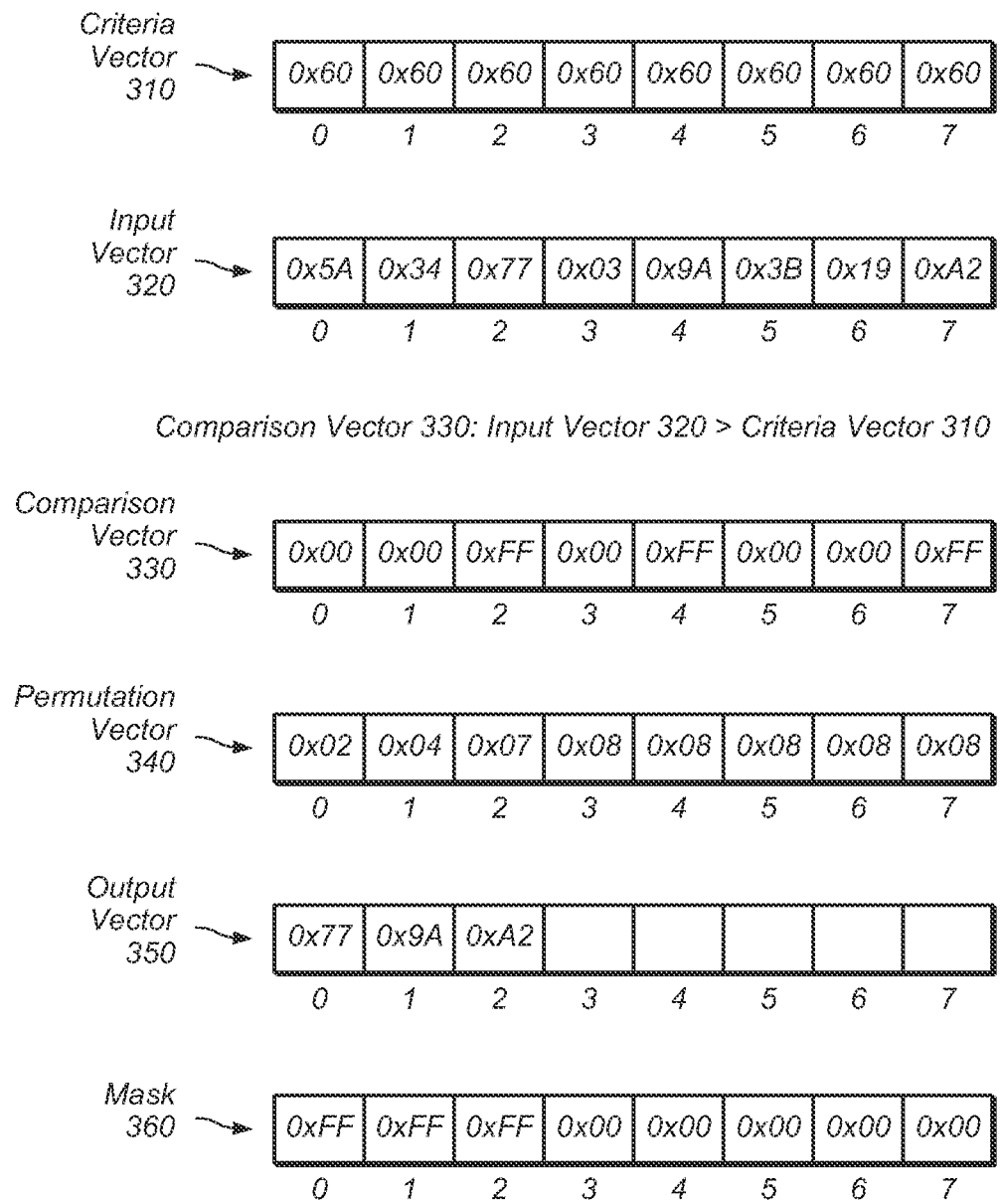
FIG. 3 illustrates a set of vectors in accordance with one embodiment.

Turning now to FIG. 3, a set of vectors that may be utilized in accordance with one embodiment of a compression operation is shown. As shown in FIG. 3, each of the various vectors contains eight elements, and the element size is eight bits. It is to be understood that other embodiments may utilize vectors of various numbers of elements and the elements may be of various sizes. For example, in another embodiment, a vector may include 16 elements wherein each element is 16 bits.

Criteria vector 310 may be loaded with criteria values which may be used to perform a comparison with input vector 320. As shown in FIG. 3, criteria vector 310 may be loaded with the value "0x60". This value is used for illustrative purposes only, and in other embodiments, other values may be stored in criteria vector 310. Also, in other embodiments, different values may be placed in the various elements of criteria vector 310, such as value "0x50" in element '0', "0x40" in element '1', and so on.

Input vector 320 may be loaded with input values, and the values shown in FIG. 3 are for illustrative purposes only. The elements in input vector 320 may be compared to criteria vector 310. In this embodiment, the comparison will determine if each of the elements in input vector 320 is greater than the corresponding element (0x60) in criteria vector 310. In other embodiments, other types of comparisons may be performed.

If an element of input vector 320 is greater than 0x60, then the element may be referred to as "selected", and if the element is less than 0x60, then the element may be referred to as "non-selected" or "de-selected". The comparison of input vector 320 to criteria vector 310 may be executed in a single SIMD instruction. The results of the comparison may be stored in vector 330. In one embodiment, comparison vector 330 may contain a "0xFF" value in each element corresponding to a selected element of input vector 320. In another embodiment, comparison vector 330 may contain a "0x01" value in each element corresponding to a selected element of input vector 320.

Permutation vector 340 may be created based on comparison vector 330. Permutation vector 340 may identify elements of input vector 320 by the element position (0-7). In the example shown in FIG. 3, permutation vector 340 contains a "0x02" value in the first element, indicating that the second element (0x77) of input vector 320 should be stored in the first element of output vector 350. Likewise, the second element of permutation vector 340 contains a "0x04" value indicating that the fourth element (0x9A) of input vector 320 should be stored in the second element of output vector 350, and the third element of permutation vector 340 contains a "0x07" value indicating that the seventh element (0xA2) of input vector 320 should be stored in the third element of output vector 350. In other embodiments, permutation vector 340 may specify that the selected elements of input vector 320 should be stored in the rightmost elements of output vector 350.

Each of the elements 3-7 of permutation vector 340 contains the value "0x08". The value "0x08" is outside of the range of 0-7, and therefore this value in elements 3-7 indicates that elements from input vector 320 will not be stored in these element locations in output vector 350. In other embodiments, other values outside of the range of 0x00-0x07 may be used to indicate that selected data will not be stored in the corresponding element locations of output vector 350. For example, 0xFF, or otherwise, could be used.

Output vector 350 may contain the three selected elements from input vector 320 in the leftmost elements (0-2). Output vector 350 is shown as not containing any data in elements 3-7. This is for illustrative purposes only, and in various embodiments, other data (e.g., fill data, "don't care" data) may be stored in the unfilled elements (3-7) of output vector 350. In other embodiments, output vector 350 may contain the selected elements of input vector 320 in the rightmost elements and the leftmost elements may be unfilled or may be filled with "don't care" data.

Mask 360 may contain indicators specifying which values in output vector 350 are selected values. As shown in FIG. 3, output vector 350 contains three selected values in the three leftmost elements. Therefore, mask 360 contains values of "0xFF" in elements 0-2 and values of "0x00" in elements 3-7. In other embodiments, mask 360 may use various other indicators to designate the selected and non-selected elements in output vector 350. For example, in one embodiment, elements of mask 360 may contain a value of "0x01" to indicate selected and a value of "0x00" to indicate non-selected.

In one embodiment, a single instruction may be executed to create the permutation vector and to perform the permutation. In another embodiment, two instructions may be executed to create the permutation vector and to perform the permutation. For example, a first instruction may set permutation vector 340 and a second instruction may utilize permutation vector 340 to perform the permutation that generates output vector 350.

Figure 4:
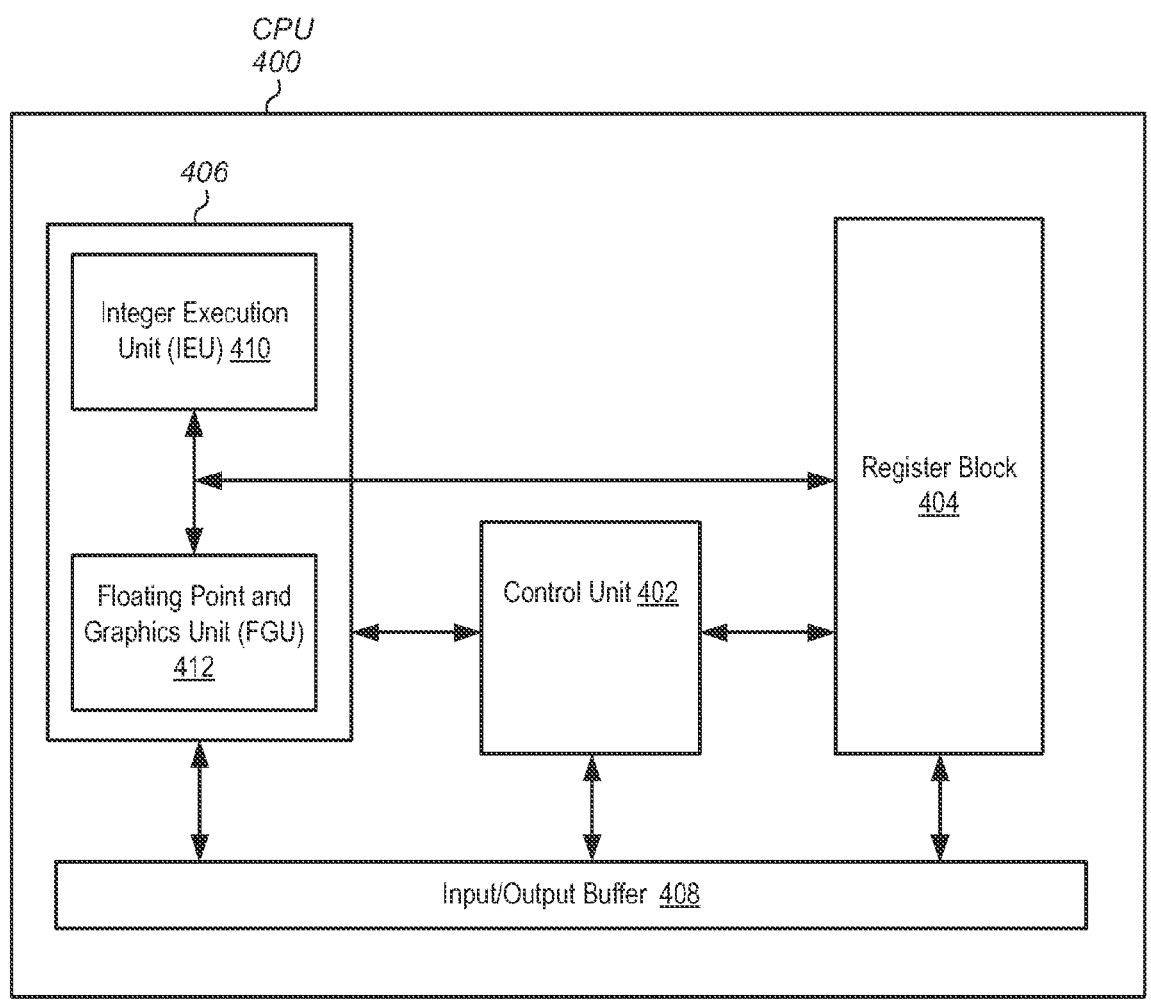
FIG. 4 illustrates a block diagram of one embodiment of a central processing unit.

Referring now to FIG. 4, a block diagram illustrating one embodiment of a central processing unit (CPU) is shown. CPU 400 includes a control unit 402 connected to a register block 404, a core execution block 406, and an input/output buffer 408. The input/output buffer 408 is responsible for fetching instructions and data from main memory or cache and passing them to control unit 402. The input/output buffer 408 also sends information from the CPU 400 to other parts of the processor and handles cache management and mapping.

The control unit 402 controls instruction execution and the movement of data within CPU 400. Instruction execution may be carried out using a pipelined schedule, wherein at any one time several instructions may be at various stages of execution within CPU 400. The control unit 402 manages the instruction pipeline by, for example, decoding instructions, checking for dependencies between instructions in the pipeline, allocating and scheduling CPU resources, and carrying out instruction renaming. Instruction renaming may involve generating helper instructions for more complex instructions.

In addition to managing the instruction pipeline, control unit 402 maintains the correct architectural state of CPU 400. Maintaining the CPU state generally involves updating special control and status registers within the register block 404. For example, the control unit 402 may maintain a program counter register used to locate the next program instruction to be executed. In addition, the control unit 402 may feature a branch prediction mechanism, wherein historical analysis of past branch results are used to predict future branch results, thereby improving the pipeline efficiency.

Register block 404 is essentially a specialized group of memory locations which are read and written by core execution block 406 and input/output buffer 408. Typically, registers may be designated as either general purpose registers or control and status registers. General purpose registers hold data and address information and may be manipulated by the instructions running in CPU 400. General purpose registers may be further categorized as either integer registers or floating-point registers. Often, the integer registers are only visible to the integer execution unit (IEU) 410 and the floating-point registers are only visible to the floating-point and graphics unit (FGU) 412. Status and control registers contain condition and control codes relating to the processor's operation. Although some status and control registers can be modified by program instructions, many registers may be configured as read only.

The core execution block 406 carries out processor computations and data manipulation. Although there are many variations of core execution block design configurations which may be used with the mechanisms and methods presented herein, core execution block 406 shown in FIG. 4 is divided into an integer execution unit (IEU) 410 and a floating-point and graphics unit (FGU) 412.

IEU 410 may be responsible for integer-based arithmetic and logical computations in CPU 400. Arithmetic computations may include virtual address calculations as well as data calculations. Typically, IEU 410 may receive a partially decoded integer instruction from control unit 402. IEU 410 may conduct a final decode of the instruction and then may execute the instruction. FGU 412 may perform floating-point, graphics, and vector instructions. FGU 412 may receive partially decoded instructions from control unit 402, complete the instruction decode, and perform vector operations as required by the current instruction.

Figure 5:
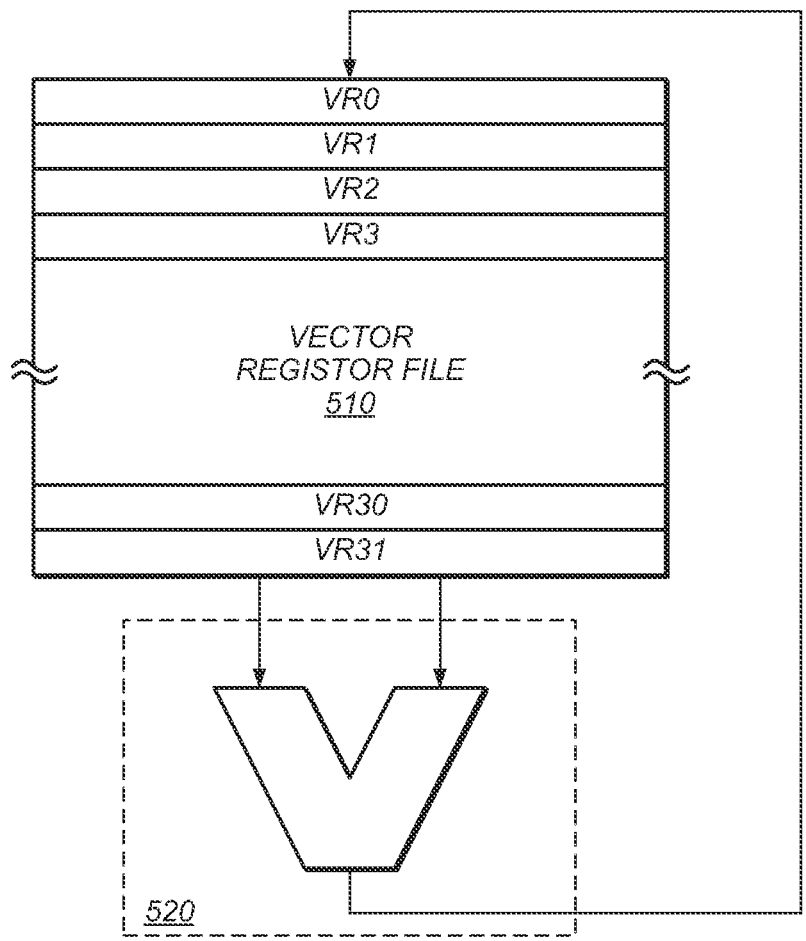
FIG. 5 is a block diagram illustrating one embodiment of a vector unit coupled to a vector register file.

Turning now to FIG. 5, a block diagram illustrating one embodiment of a vector unit coupled to a vector register file is shown. Vector register file 510 includes a set of 32 registers VR0, VR1, ... VR31, and the size of the registers may depend on the size of vector unit 520. In other embodiments, vector register file 510 may include other numbers of registers, such as 64, 128, or any other suitable number. In various embodiments, the size of the registers may be 64 bits, 128 bits, or any other suitable number of bits. Each register in vector register file 510 may store a plurality of data elements. For example, if the size of a vector register is 64 bits, then a vector register may store 4 16-bit elements, 8 8-bit elements, or other such combinations. In one embodiment, vector register file 510 may store vectors 310-360 (of FIG. 3).

Vector unit 520 may include one or more computing units capable of operating on source vectors read from vector register file 510. In one embodiment, vector unit 520 may be included in a floating point and graphics unit, such as floating point and graphics unit 412 (of FIG. 4). Vector unit 520 may generate a single result for each vector instruction, and the result may be written to a register in vector register file 510. In various embodiments, vector unit 520 may operate on two source vectors supplied by vector register file 510. In one embodiment, vector unit 520 may execute one or more of the instructions of code 200 (of FIG. 2).

Figure 6:
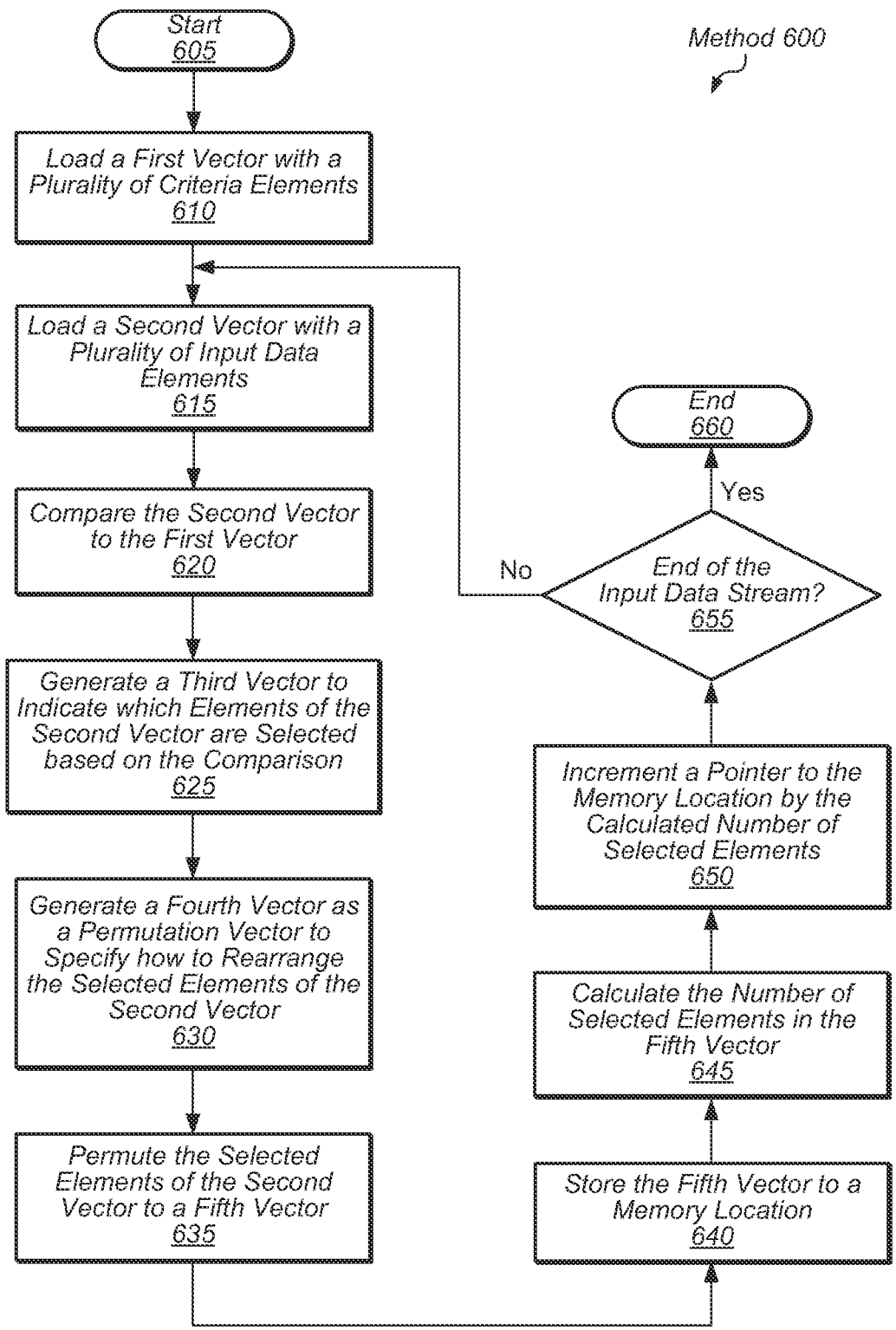
FIG. 6 is a generalized flow diagram illustrating one embodiment of a method for compressing selected elements of a vector.

Turning now to FIG. 6, one embodiment of a method for compressing selected elements of a vector is shown. For purposes of discussion, the steps in this embodiment are shown in sequential order. It should be noted that in various embodiments of the method described below, one or more of the steps described may be performed concurrently, in a different order than shown, or may be omitted entirely. Other additional steps may also be performed as desired.

Method 600 starts in block 605, and then a first vector may be loaded with a plurality of criteria elements (block 610). In one embodiment, each of the plurality of criteria elements may be the same value. In another embodiment, the values of the plurality of criteria elements may be different. Next, a second vector may be loaded with a plurality of input data elements (block 615). The input data elements may be part of a data stream. Then, the second vector may be compared to the first vector (block 620).

Next, a third vector may be generated to indicate which elements of the second vector are selected based on the comparison (block 625). Each element of the second vector may be classified as selected or non-selected based on the comparison to the first vector. The third vector may include an indicator for each element of the second vector. In one embodiment, the indicator may be a value of '1' if the corresponding element of the second vector is selected, and the indicator may be a value of '0' if the corresponding element of the second vector is non-selected. In another embodiment, the indicators may be reversed, such that '0' indicates non-selected and '1' indicates selected.

After block 625, a fourth vector may be generated as a permutation vector to specify how to rearrange the selected elements of the second vector (block 630). The fourth vector may contain an index for each selected element of the second vector, and each index may contain address data of a selected element of the second vector. In one embodiment, the indices may be arranged in the leftmost contiguous elements of the fourth vector. In another embodiment, the indices may be arranged in the rightmost contiguous elements of the fourth vector.

Next, the selected elements of the second vector may be permuted to a fifth vector (block 635). In one embodiment, the selected elements may be stored in the leftmost contiguous elements of the fifth vector. In another embodiment, the selected elements may be stored in the rightmost contiguous elements of the fifth vector. Then, the fifth vector may be stored to a memory location (block 640). In various embodiments, the memory location may be a location in system memory or a location in another storage device.

After block 640, the number of selected elements in the fifth vector may be calculated (block 645). The number of selected elements may range from zero up to the number of elements in the fifth vector. In one embodiment, a mask may be generated in a sixth vector to indicate which elements of the fifth vector are selected elements. Additionally, the number of selected elements in the fifth vector may be calculated using the mask. In some embodiments, the number of selected elements in the fifth vector may be calculated prior to the fifth vector being stored to a memory location.

After block 645, a pointer to the storage device may be incremented by the calculated number of selected elements (block 650). Next, if the end of the input data stream has been reached (conditional block 655), then method 600 may end in block 660. If the end of the input data stream has not been reached (conditional block 655), then method 600 may return to block 615 to load the second vector with a new set of input data elements. In various embodiments, each of the vectors used in method 600 may have the same number of elements. Additionally, each of the operations may be a vector operation, wherein a vector operation is defined as an operation that is performed simultaneously on all elements of one or more vectors in a single clock cycle.

Figure 7:
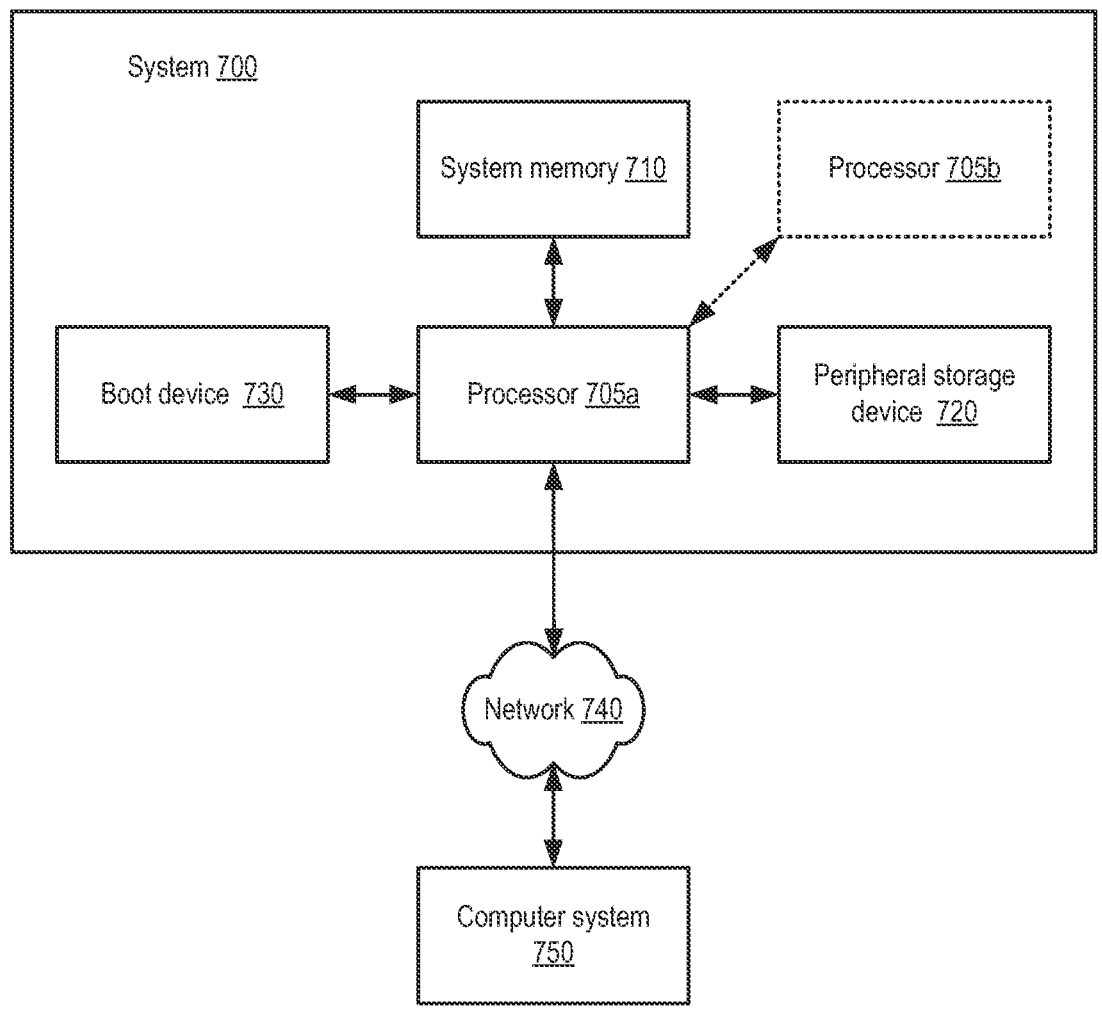
FIG. 7 is a block diagram illustrating one embodiment of a system including a processor.

Referring now to FIG. 7, a block diagram of one embodiment of a system including a processor is shown. In the illustrated embodiment, system 700 includes an instance of processor 705, shown as processor 705*a*, that is coupled to a system memory 710, a peripheral storage device 720, and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

System 700 may be incorporated into many different types of electronic devices. For example, system 700 may be part of a desktop computer, a laptop computer, a server, a media player, an appliance, a cellular phone, testing equipment, a network appliance, a calculator, a personal digital assistant (PDA), a smart phone, a guidance system, a control system (e.g., an automotive control system), or another electronic device.

In some embodiments, system 700 may be configured as a multiprocessor system, in which processor 705*a* may optionally be coupled to one or more other instances of processor 705, shown in FIG. 7 as processor 705*b*. For example, processors 705*a-b* may be coupled to communicate via their respective coherent processor interfaces.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 705 that provide multiple memory interfaces. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 705 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 705, such as multimedia devices, graphics/display devices, standard input/output devices, etc.

In one embodiment, boot device 730 may include a device such as an FPGA or ASIC configured to coordinate initialization and boot of processor 705, such as from a power-on reset state. Additionally, in some embodiments boot device 730 may include a secondary computer system configured to allow access to administrative functions such as debug or test modes of processor 705.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be configured in a substantially different manner. For example, computer system 750 may be a server system, a processor-based client system, a stateless "thin" client system, a mobile device, etc.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any non-transitory storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method comprising:
fetching instructions and data from a memory;
decoding the fetched instructions; and
processing decoded vector instructions used to compress vectors in the fetched data by:
performing a comparison of each of a plurality of elements of a source vector to given criteria to generate a result vector, wherein the result vector comprises a separate result of the comparison for each of the plurality of elements;
performing a compressed select operation on the result vector to generate a permutation vector, wherein the permutation vector identifies one or more elements of the plurality of elements meeting the given criteria and identifies a permuted position for each of the one or more elements;
performing a first permutation operation using said permutation vector on the plurality of elements of the source vector to generate an intermediate vector; and
selecting the one or more elements of the plurality of elements in the intermediate vector meeting the given criteria to store in an output vector, wherein the output vector comprises only said one or more elements.

2. The method as recited in claim 1, wherein said comparison, storing, generating, and permutation are vector operations.

3. The method as recited in claim 2, wherein selecting said one or more elements comprises generating a mask vector different from the result vector and the permutation vector, wherein the mask vector comprises an indication for each of the one or more elements of the plurality of elements in the intermediate vector meeting the given criteria, wherein each of said one or more elements stores a same indication.

4. The method as recited in claim 3, further comprising:
determining by using said mask a number of how many of the plurality of elements of the source vector meet said criteria; and
incrementing a pointer by said number, wherein the pointer points to a storage location located immediately after said one or more elements in the output vector stored in contiguous storage locations.

5. The method as recited in claim 3, further comprising performing a second permutation operation using said permutation vector on the result vector to generate the mask vector.

6. The method as recited in claim 5, wherein determining said number comprises performing a population count vector operation on said mask.

7. The method as recited in claim 2, wherein said one or more elements stored in the output vector overwrites one or more elements of a previous intermediate vector that did not meet previous criteria.

8. A processor comprising:
an input/output (I/O) buffer configured to fetch instructions and data from a memory;
a control unit configured to decode the fetched instructions; and
a floating-point and graphics unit (FGU) comprising:
a vector unit for processing decoded vector instructions used to compress vectors in the fetched data; and
a vector register file, wherein the vector register file is coupled to the vector unit;
wherein to process decoded vector instructions, the vector unit is configured to:
perform a comparison of each of a plurality of elements of a source vector to given criteria to generate a result vector, wherein the result vector comprises a separate result of the comparison for each of the plurality of elements;
perform a compressed select operation on the result vector to generate a permutation vector, wherein the permutation vector identifies one or more elements of the plurality of elements meeting the given criteria and identifies a permuted position for each of the one or more elements;
perform a first permutation operation using said permutation vector on the plurality of elements of the source vector to generate an intermediate vector; and select the one or more elements of the plurality of elements in the intermediate vector meeting the given criteria to store in an output vector, wherein the output vector comprises only said one or more elements.

9. The processor as recited in claim 8, wherein said comparison, storing, generating, and permutation are vector operations.

10. The processor as recited in claim 9, wherein to select said one or more elements, the vector unit is further configured to generate a mask vector different from the result vector and the permutation vector, wherein the mask vector comprises an indication for each of the one or more elements of the plurality of elements in the intermediate vector meeting the given criteria, wherein each of said one or more elements stores a same indication.

11. The processor as recited in claim 10, wherein the vector unit is further configured to:
determine by using said mask a number of how many of the plurality of elements of the source vector meet said criteria; and
increment a pointer by said number, wherein the pointer points to a storage location located immediately after said one or more elements in the output vector stored in contiguous storage locations.

12. The processor as recited in claim 10, wherein the vector unit is further configured to perform a second permutation operation using said permutation vector on the result vector to generate the mask vector.

13. The processor as recited in claim 12, wherein determining said number comprises performing a population count vector operation on said mask.

14. The processor as recited in claim 9, wherein said one or more elements stored in the output vector overwrites one or more elements of a previous intermediate vector that did not meet previous criteria.

15. A non-transitory computer readable storage medium comprising program instructions, wherein when executed the program instructions are operable to:
fetch instructions and data from a memory;
decode the fetched instructions; and
wherein to process decoded vector instructions used to compress vectors in the fetched data:
perform a comparison of each of a plurality of elements of a source vector to given criteria to generate a result vector, wherein the result vector comprises a separate result of the comparison for each of the plurality of elements;
perform a compressed select operation on the result vector to generate a permutation vector, wherein the permutation vector identifies one or more elements of the plurality of elements meeting the given criteria and identifies a permuted position for each of the one or more elements;
perform a first permutation operation using said permutation vector on the plurality of elements of the source vector to generate an intermediate vector; and
select the one or more elements of the plurality of elements in the intermediate vector meeting the given criteria to store in an output vector, wherein the output vector comprises only said one or more elements.

16. The non-transitory computer readable storage medium as recited in claim 15, wherein said comparison, storing, generating, and permutation are vector operations.

17. The non-transitory computer readable storage medium as recited in claim 16, wherein to select said one or more elements, the program instructions are further operable to generate a mask vector different from the result vector and the permutation vector, wherein the mask vector comprises an indication for each of the one or more elements of the plurality of elements in the intermediate vector meeting the given criteria, wherein each of said one or more elements stores a same indication.

18. The non-transitory computer readable storage medium as recited in claim 17, wherein the program instructions are further operable to:
determine by using said mask a number of how many of the plurality of elements of the source vector meet said criteria; and
increment a pointer by said number, wherein the pointer points to a storage location located immediately after said one or more elements in the output vector stored in contiguous storage locations.

19. The non-transitory computer readable storage medium as recited in claim 18, wherein the program instructions are further operable to perform a second permutation operation using said permutation vector on the result vector to generate the mask vector.

20. The non-transitory computer readable storage medium as recited in claim 19, wherein determining said number comprises performing a population count vector operation on said mask.

* * * * *